(12) United States Patent
Mochizuki et al.

(10) Patent No.: US 7,564,209 B2
(45) Date of Patent: Jul. 21, 2009

(54) MICRO-MANIPULATOR

(75) Inventors: Naoto Mochizuki, Fuefuki (JP);
Hirofumi Kaneko, Kofu (JP); Masahiro Kouno, Fuefuki (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 500 days.

(21) Appl. No.: 11/593,028

(22) Filed: Nov. 6, 2006

(65) Prior Publication Data

US 2007/0147978 A1     Jun. 28, 2007

(30) Foreign Application Priority Data

Nov. 7, 2005     (JP)     ............................. 2005-322566

(51) Int. Cl.
  *B25J 9/18*     (2006.01)
(52) U.S. Cl. ............................. 318/568.11; 318/568.12; 318/568.16; 318/568.21; 700/245; 700/258; 700/260
(58) Field of Classification Search ............ 318/568.11, 318/568.12, 568.15, 568.16, 568.2, 568.21, 318/568.22; 700/245, 258, 259, 260, 262
See application file for complete search history.

(56) References Cited

U.S. PATENT DOCUMENTS

| | | | | |
|---|---|---|---|---|
| 5,831,408 | A  * | 11/1998 | Jacobus et al. | 318/568.11 |
| 6,587,750 | B2 * | 7/2003  | Gerbi et al.   | 700/245 |
| 6,594,552 | B1 * | 7/2003  | Nowlin et al.  | 700/260 |
| 6,879,880 | B2 * | 4/2005  | Nowlin et al.  | 700/260 |
| 7,373,219 | B2 * | 5/2008  | Nowlin et al.  | 700/245 |

* cited by examiner

*Primary Examiner*—Bentsu Ro
*Assistant Examiner*—Thai Dinh
(74) *Attorney, Agent, or Firm*—Manabu Kanesaka

(57) ABSTRACT

A micro-manipulator has grippers for gripping micro-material; an actuator for driving the grippers; a drive amount detection device for detecting a drive amount of the actuator; a power control device for controlling power supplied to the actuator so that a difference in a target drive amount of the input actuator and a drive amount detected by the drive amount detection device is small, after at least the grippers touch the micro-material; a gripping determination device for determining that grippers have gripped the micro-material based on the difference; and a resilience value calculation device for calculating a resilience value that represents a degree of softness of the micro-material by dividing the actuator drive force that is equivalent to the repulsive force of micro-material gripped by the grippers in proportion to power supplied to the actuator via the power control device.

9 Claims, 6 Drawing Sheets

MICRO-MANIPULATOR

BACKGROUND OF THE INVENTION AND RELATED ART STATEMENT

The present invention relates to micro-manipulators, and particularly to micro-manipulators that use gripping fingers to grip resilient micro-material.

Conventionally, micro-manipulators are used to assemble micro-parts or to handle cells. Generally, a micro-manipulator has a gripping mechanism for moving the leading ends of gripping fingers to grip micro-objects. (See patent publication 1, for example) Also, because the material to be gripped is minute, an operator observes at the object through a microscope with the naked eye, or observes images of the object output to a monitor such as a display via a camera mounted on the microscope, in order to operate the micro-manipulator. (See patent publication 2, for example)

If the micro-material to be gripped is derived from a living body, such as a cell, the micro-manipulator needs to be operated while visually checking the degree of deformation of the cell, in order to avoid damaging it with excessive gripping forces. Specifically, in order to prevent flicking metallic micro-material or crushing micro-material such as a cell when the gripping force is too great, resilient means and current restricting means have been applied to limit the operation and control the maximum gripping force.

[Patent Publication 1] Tokkai Hei 8-168979
[Patent Publication 2] Tokkai Hei 4-303810

However, the operation of conventional micro-manipulators is such that the resilience of the micro-material, in other words, the hardness or softness of the object, is unknown to the operator as the micro-material is gripped while an operator viewed it on a screen. For that reason, the operator does not know exactly how much force to apply to the grippers when gripping the micro-material. For example, when gripping a metallic micro-material and too much force is applied, the metallic micro-material tends to be undesirably flicked away. If handling a micro-material such as a cell, too much applied force tends to crush the cell.

In view of the above-described shortcoming, it is an object of the present invention to provide a micro-manipulator that can appropriately grip resilient micro-material and which can ascertain the resilience value of the micro-material.

SUMMARY OF THE INVENTION

To overcome the problems associated with the prior art, a first aspect of the present invention provides grippers for gripping micro-material; an actuator for driving a gripping finger; a drive amount detection device/means for detecting the drive amount of the actuator; power control device/means for controlling the electrical power supplied to the actuator so that a difference between the target drive amount of the input actuator and drive amount detected by drive amount detection device/means is small after at least gripping fingers touch a micro-material; gripping determination device/means for determining that the gripping fingers have gripped the micro-material based on that difference; and resilience value calculating device/means for calculating a resilience device/means that represents a degree of softness of the micro-material when gripping determination device/means determine that micro-material has been gripped, by finding a drive force of the actuator, divided by the difference, that is equivalent to a repulsive force of the micro-material gripped by the grippers in proportion to the power supplied to the actuator via the power control device/means.

In accordance with another aspect of the present invention, grippers are driven by an actuator and micro-material is gripped by the grippers. The drive amount detection device/means detects the drive amount of the actuator. Power supplied to the actuator is controlled by the power control device/means so that the difference between a target drive amount of an input actuator and a drive amount detected by drive amount detection device/means, is small, at least when grippers touch the micro-material. When gripping determination device/means determine that grippers have gripped the micro-material based on the difference of the target drive amount and the detected drive amount, the resilience value calculating device/means calculate the resilience value that represents the softness of the micro-material by dividing to determine the drive force of the actuator equivalent to the repulsive force of the micro-material gripped by the grippers, in proportion to the power supplied to the actuator via the power control device/means with the difference of the target drive amount of the actuator and the detected drive amount.

In accordance with at least one further aspect of the present invention, it is acceptable to control the current supplied by the power control device/means to the actuator at a constant voltage, to be proportional to the difference between the target drive amount of the actuator and a drive amount detected by drive amount detection device/means. Also provided are current setting device/means for setting the current supplied to the actuator. The power control device/means can supply the current set by the current setting device/means to the actuator prior to at least the grippers touching the micro-material. Maximum current setting device/means for setting a maximum current to be supplied to the actuator are also provided. The power control device/means can supply a current to the actuator using the maximum current set by the maximum current setting device/means as an upper limit.

In accordance with a further aspect of the present invention, gripping determination device/means determine that the grippers have gripped a micro-material when a differential value of the difference in time of the target drive amount and the drive amount detected by the drive amount detection device/means is smaller than a preset value. The resilience value calculating device/means can calculate a resilience value using an equation of $k=F/\Delta\theta$, where F is the actuator drive force, $\Delta\theta$ is a difference between the actuator target drive amount and the drive amount detected by the drive amount detection device/means, and k is the resilience value of the micro-material. Also, it is advantageous for the drive amount detection device/means to have a Hall element embedded in the actuator. The grippers have two end effectors and can be used as a meter for the actuator. In this way, it is advantageous that the micro-manipulator further be provided resilience value output device/means for outputting a resilience value calculated by the resilience value calculation device/means.

According to at least one embodiment of the present invention, after at least the gripping fingers touch the micro-material, the electrical power supplied to the actuators is controlled by electrical power control device/means to reduce the difference in drive amounts and to suppress an increase of a load on the micro-material. Therefore, along with attaining an appropriate grip of the resilient micro-material, a resilience value of a micro-material is computed by resilience value computing device/means so it is possible to grip with the resilience value of the micro-material.

The following explains the micro-manipulator according to embodiments of the present invention with reference to the drawings provided, as it is applied to a micro-material handling system for handling micro-material.

BRIEF DESCRIPTION OF THE DRAWINGS

FIGS. 4(A) through (E) are exploded perspective views of a gripping actuator; wherein FIG. 4(A) is a flexible printed circuit board connected with a Hall element; 4(B) is a yoke for efficiently composing a magnetic circuit; 4(C) is a coil frame wrapped with a covered copper wire; 4(D) is a rotating permanent magnet; and 4(E) is a bottom cover of the coil frame.

DETAILED DESCRIPTION OF THE PREFERRED EMBODIMENTS

Figure 1:
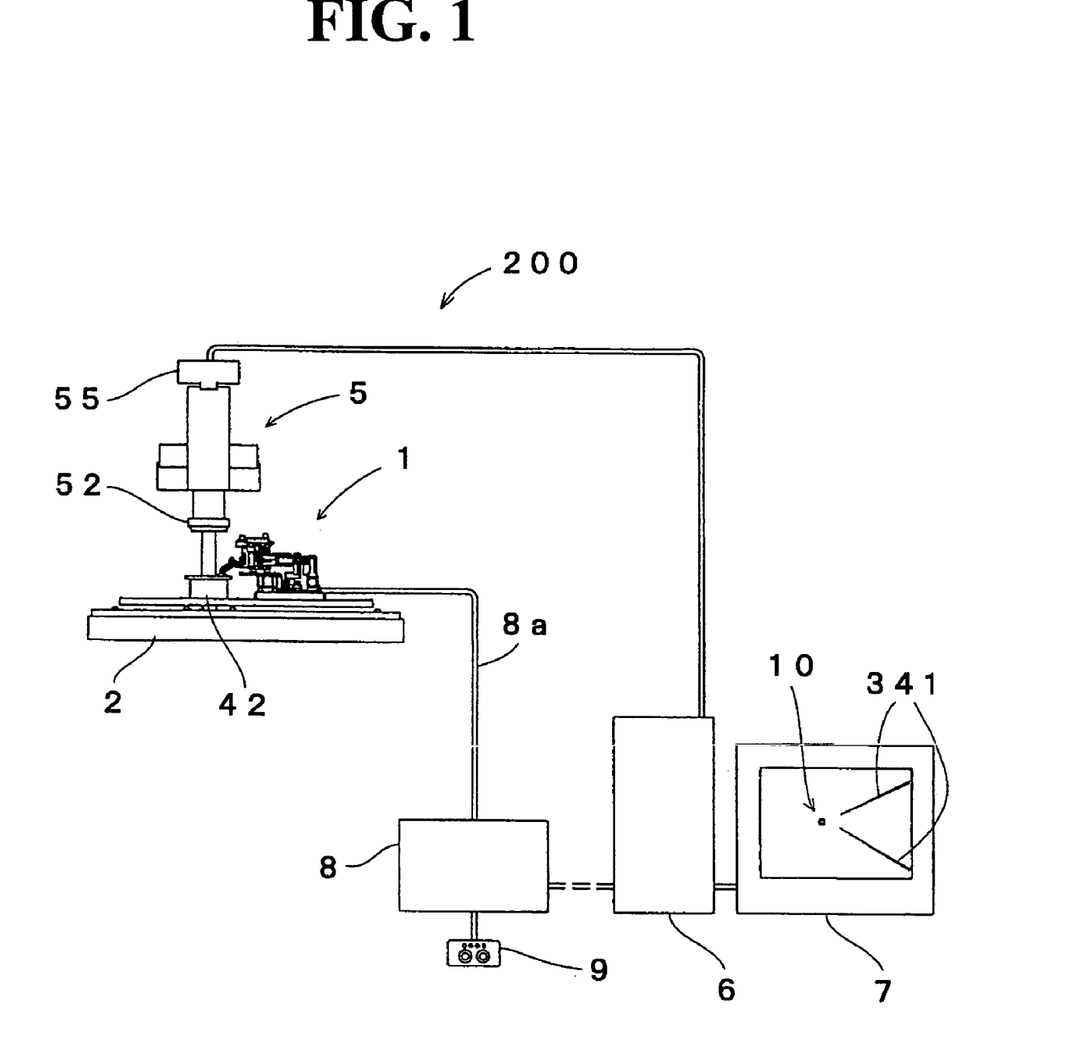
FIG. 1 is a schematic view of a micro-material handling system of an embodiment that employs the present invention.

As shown in FIG. 1, a micro-material handling system 200 of this embodiment of the present invention is provided a micro-manipulator 1 fastened to a surface plate 2 for handling cells; a microscope 5 for viewing cells placed on an XY stage (moving stage) 42; a personal computer (hereinafter referred to as a PC) 6; and a programmable logic controller (hereinafter referred to as a PLC) 8 as a part of electrical power control device/means for controlling the micro-manipulator 1 as a slave computer of the PC6, grip judging device/means, resilience value computing device/means, part of the resilience value output device/means, part of the drive amount detection device/means, the current setting device/means, and the maximum current setting device/means.

An I/O cable for I/O with the PLC8, an output cable to a monitor 7 such as an LCD device, and an input cable from the CCD camera 55 mounted on the microscope 5 are each connected to the PC 6. One end of a connecting cable 8a for sending operating signals to the micro-manipulator 1, and a controller (input device) 9 having a joystick and crosshair button for applying instructions to the PLC8 are connected to the PLC8. Another end of the connecting cable 8a is connected to the micro-manipulator 1. Therefore, the operator of the micro-material handling system 200 can look at the cell 10 set on the XY stage 42 via the monitor 7.

Figure 2:
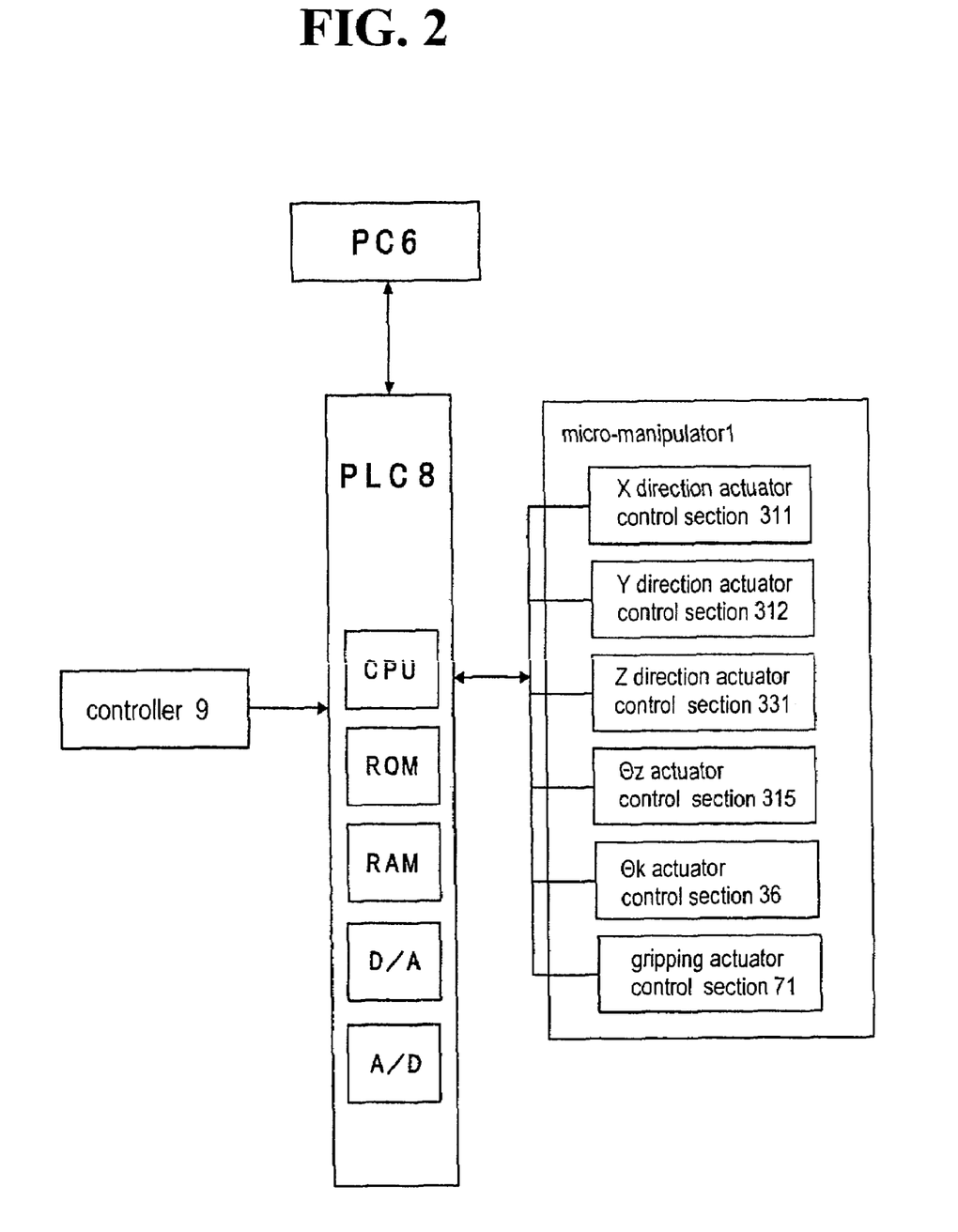
FIG. 2 is a block diagram shown a control unit of the micro-material of the micro-material handling system.

As shown in FIG. 2, the PLC8 also has a D/A converter, an A/D converter and an I/O, in addition to a CPU, ROM, and RAM. The PLC8 receives basic operating instructions from the PC6 according to programs and program data stored in the ROM, and sends data detected by an encoder and various actuator statuses to the PC6 via the registered trademark product Ethernet. Furthermore, the PLC8 includes actuator control units that convert instructions input from the controller 9 into each actuator's control signal and that send the instructions to the micro-manipulator 1 via the connecting cable 8a.

As shown in FIG. 1, the microscope 5 is composed of the XY stage 42, the bottom side of which is fastened to the surface plate 2; a lens barrel mounted with a zoom lens 52 on the XY stage 42 side; and a CCD camera 55 mounted at the top of the lens barrel. The lens barrel is mounted to slide in up and down directions on a support shaft mounted to the surface plate 2 to focus on a cell 10. The XY stage 42 has a base fastened to the surface plate 2, a Y direction stage that slides in a Y direction, and an X direction stage that slides in an X direction. Two sliders arranged at a bottom surface of the Y direction stage are in sliding contact with two slide rails parallel in an X direction arranged at a top surface of the base. Two sliders arranged at a bottom surface of the X direction stage, are in sliding contact with two slide rails parallel in an X direction and arranged at a top surface of the Y direction stage.

Figure 3:
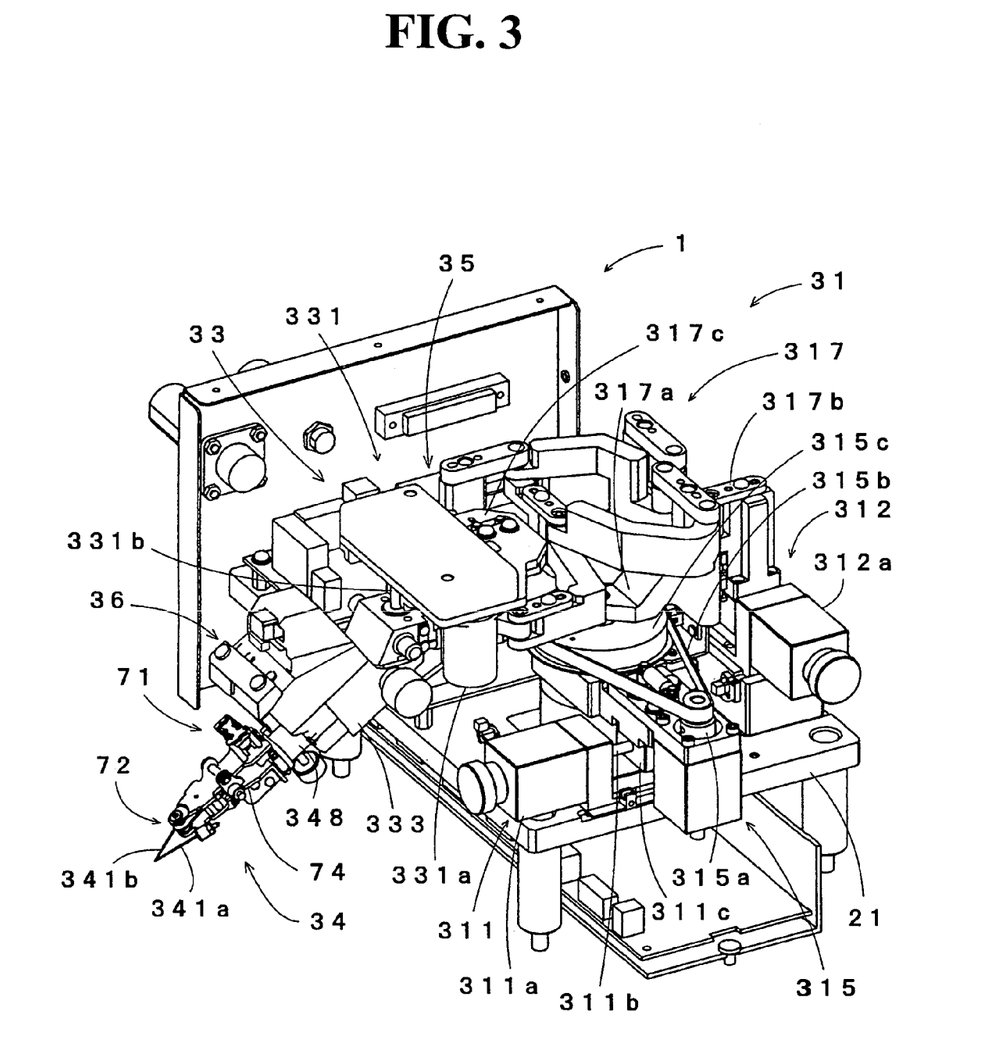
FIG. 3 is a perspective view of a part of the micro-material handling system depicted in FIG. 1.
Figure 4:
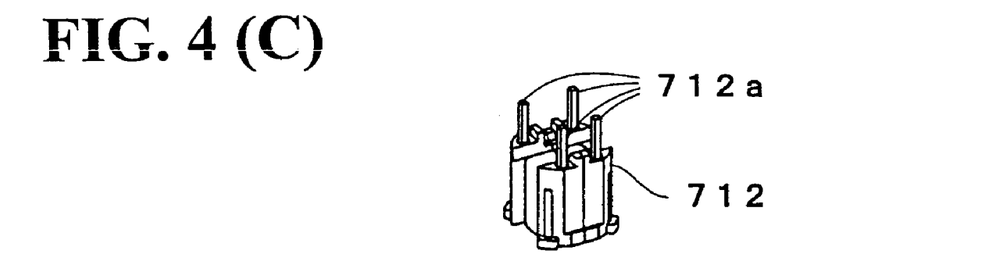

As shown in FIG. 3, the micro-manipulator 1 is generally composed of a handling unit 34 for operating a cell 10; XY drive unit 31 (an X direction actuator 311 and Y direction actuator 312 described below) for moving the handling unit 34 in X and Y directions; and a Z drive unit 33 (Z direction actuator 331 described below) for moving the handling unit 34 in a Z direction. The XY drive unit 31 has a θz actuator 315 that rotates (strictly speaking, hereinafter this is called swinging because it is equivalent to swinging in a rotating swinging mechanism) the handling unit 34 over the XY plane centering on the leading ends (gripping fingers 341 described below) of the handling unit 34, and changing the attitude direction of the handling unit 34 with regard to the cell 10 placed on the XY stage 42.

The XY drive unit 31 is arranged on a base 21 supported by four posts fastened to the surface plate 2. The Z drive unit 33 is supported at an output side (microscope 5 side) of the XY drive unit 31. A drive circuit 35 that receives control signals sent from the PLC 8 via the connecting cable 8a to drive the XY drive unit 31, the Z drive unit 33, and the handling unit 34 is arranged on the backside of the XY drive unit 31 at the top of the base 21. A signal connector that connects a power supply connector connected to an external power source and the connecting cable 8a is arranged at the facing of the backside.

The handling unit 34 is arranged at the microscope 5 side of the Z drive unit 33. A θk actuator 36 that rotates the handling unit 34 around a shaft supporting the handling unit 34, to change the attitude direction of the handling unit 34 with regard to the cell 10, is arranged between the Z drive unit 33 and the handling unit 34.

<ZY Drive Unit 31>

The X direction actuator 311 that is the drive source for driving the handling unit 34 in the X and Y directions, and the Y direction actuator 312, are fastened in a direction where they intersect each other on the base 21.

The X direction actuator 311 is a direct acting actuator having a forward and reverse drive stepping motor 311a that includes an encoder; a slider 311c that is an output shaft of the stepping motor 311a, as an output unit to engage a ball screw 311b formed at an opposite side of the encoder; and a rectilinear guide rail, not shown, that can slide the slider 311c. In the same way, the Y direction actuator 311 has a forward and reverse drive stepping motor 312a that has an encoder; a slider that is an output shaft of the stepping motor 312a, and engages a ball screw formed at an opposite side of the encoder; and rectilinear guide rail, not shown, that can slide the slider.

A θz actuator 315 composed of a stepping motor is fastened to the slider 311c of the X direction actuator 311 to supply drive force to change the attitude direction of the handling unit 34. An output shaft 315a of the θz actuator 315 is connected to a pulley 315c whose diameter is larger than the output shaft 315a, via a belt 315b. The rotating shaft of the pulley 315c is fastened to an X direction input link 317a of the pantograph mechanism 317. Also, the slider of the Y direction actuator 312 is fastened to a Y direction input link 317b of the pantograph mechanism 317. For that reason, the X direction actuator 311, the Y direction actuator 312 and θz actuator 315 apply θz displacement to the pantograph mechanism 317 to directly displace the X and Y directions, and to change the position (to swing the handling unit 34) of the handling unit 34, as described below.

The pantograph mechanism 317 is composed by combining, in addition to the X direction input link, and Y direction input link, a plurality of substantially rectilinear links and a plurality of revolute pair (for example seven links and nine revolute pairs), and an output link 317c on the handling unit 34 side. Therefore, the X and Y direction direct displacements and θz displacement described above, input from the X direction actuator 311, the Y direction actuator 312, and the θz actuator 315 are synthesized, expanded and contracted and output to the output link 317c. The pantograph mechanism 317 is arranged at above these actuators so that it does not interfere with the X direction actuator 311, the Y direction actuator 312 and the θz actuator 315. Also, the Z drive unit 33 is supported on the handling unit 34 side of the output link 317c.

<Z Drive Unit 33>

The Z direction actuator 331 of the Z drive unit 33 is composed of a stepping motor 331a supported at a bottom side of the output link 317c and capable of both forward and reverse rotations; a gear box having a deceleration gear train for deceleration of rotating drive force from the stepping motor 331a; and a ball screw 331b for moving the handling unit 34 in the Z direction. In other words, the leading end (top portion) of the ball screw 331b extended downward is linked to the output end of the gear box deceleration gear train. A nut is fastened by a screwing to the ball screw 331b. A support member 333 for supporting the θk actuator 36 is fastened to the nut. The θk actuator 36 is supported by the support member 333. The handling unit 34 is detachably supported via a shaft 348 on the θk actuator 36.

<Handling Unit 34>

The θk actuator 36 that rotates the handling unit 34 around the shaft 348, in other words, that applies rotating displacement (θk displacement) to the handling unit 34, is fastened to the support member 333. The θk actuator 36 is composed of a stepping motor capable of both forward and reverse rotations; and a deceleration gear train for decelerating rotational drive force from the stepping motor. The output end of the deceleration gear train is connected to the shaft 348. For that reason, the rotational drive force from the stepping motor of the θk actuator 36 is decelerated by the deceleration gear train and transmitted to the handling unit 34 via the shaft 348, thereby rotating the handling unit 34 centering on the shaft 348 at a range of ±90 degrees, for example.

The handling unit 34 has gripping fingers 341 as operators. These comprise a movable finger and a fixed finger for gripping a cell 10. A fixed end effecter 341b is supported by the fixed finger; and a movable end effecter 341a is supported by the movable finger.

A gripping actuator 71, composed of an electromagnetic drive type meter, is fastened along with a bracket to the gripping base 74 of the handling unit 34 as an actuator to drive (move) the gripping fingers 341. A plate is assembled (fastened) to the trailing end of the fixed finger is fastened to the griping base, forming a fixed gap with the base 74, with the fixed finger installed. A long, plate-shaped lever 72 is lies in this gap. The movable finger is fastened to a leading end of the lever 72 (an opposite side of the Z drive unit 33). A fulcrum shaft projects both up and down at the center of the leading end. This gap is demarcated by the fulcrum shaft being supported at a bearing of the plate and the bearing of the gripping base 74. A substantially U-shaped slit (notch) is formed at the trailing end of the lever 72. An output pin of the gripping actuator 71 engages the slit. Therefore, when the gripping actuator 71 is driven, the lever 72 swings centering on the fulcrum shaft, thereby bringing the fixed end effecter 341b into and out of proximity with the movable end effecter 341a to grip or to release a cell 10. Note that the fixed end effecter 341b and the movable end effecter 341a are adjustable by a screw arranged at the fixed finger and the movable finger so that their leading ends can touch each other, with a separated state of the leading ends being the standard state.

As shown in FIGS. 4(A) through 4(E), the gripping actuator 711 has a cylindrical permanent magnet centrally mounted with two poles in a diameter direction. A rotating shaft 711a centrally penetrates the permanent magnet 711, and a toric member with a projecting arm is fastened at the bottom. An output pin 711c that engages the slit of the lever 72 described above projects downward from the arm. Note that the arm and output pin 711c are unitized to the toric member. The permanent magnet 711 is housed inside a coil frame 712 having a cylindrical space inside, fastened with four terminal pins 712a and a bottom cover 713 mated to the coil frame 712, and the top and bottom ends of the rotating shaft 711a are pivotally supported to rotate with the coil frame 712 and the bottom cover 713.

A covered, copper wire coil, not shown, is wrapped around the outside of the coil frame 712 to generate torque that rotates the permanent magnet 711. Both ends of the covered copper wire coil are connected to the terminal pin 712a.

The coil frame 712 is housed in a yoke 714 having a gap and forming a closed loop in the line of magnetic force of the permanent magnet 711 to increase the efficiency of the magnetic circuit. The yoke 714 is fastened to the bottom cover 713, and an angle control member for controlling a rotation angle of the arm is unitized to the bottom cover 713. A flexible printed circuit board 715 connected to the drive circuit 35 is arranged above the yoke 714. Four terminal pins 712a are each connected to the flexible printed circuit board 715. A Hall element 715a is mounted to the flexible printed circuit board 715 as a part of drive amount detection device/means for detecting rotating displacement of the permanent magnet 711. The Hall element 715a is connected to the terminal pin 712a. The Hall element 715a is inserted between the coil frame 712 and the yoke 714. In other words, the Hall element 715a is embedded in the gripping actuator 71. Note that the gripping actuator 71 has an upper cover arranged at an upper side of the yoke 714, but that cover is omitted from FIG. 4.

The Hall element 715a is connected to the PLC8 via the flexible printed circuit board 715 and the drive circuit 35. Therefore, the PLC8 converts analog voltage output from the Hall element 715a into digital using the embedded A/D converter to detect the magnetic displacement (orientation) accompanying rotation of the permanent magnet 711. Note that according to the embodiment of the present invention, a sampling speed of the embedded A/D converter is 1 ms.

Also, the handling unit 34 has a mechanical shock actuator for applying a mechanical shock to the gripping fingers 341 to detach a cell 10 gripped by the fixed end effecter 341b and movable end effecter 341a. The handling unit 34 has a base for pivotally supporting the shaft 348 and the shaft 348 inserted into the base is fastened by a screw. The base is embedded with a mechanical shock actuator composed of a brush solenoid that has a plunger unit and coil unit. The gripping base 74 is pivotally supported in a hole formed in the arm projecting upward of the base. One side of the plunger unit is pivotally supported on an arm projecting downward of the gripping base 74, and the other side of the plunger unit is inserted in the coil unit.

Also, a coil spring is trained between a pin projected at a side surface of the gripping base 74, and a pin projected at a side surface of the base. This spring urges the gripping base 74 clockwise toward the base using the pivotally supported shaft as a rotation pivot point, and the urging force of the spring holds the stopper at rest in contact with the base.

(Operation)

The following explains the actions of the micro-material handling system 200 of the present embodiment focusing on the actions of the micro-manipulator 1.

First, as shown in FIG. 1, an operator drives the XY stage 42 to capture the cell 10 placed on the XY stage 42 in the screen of the monitor 7, via the microscope's 5 CCD camera 55.

When electric power is applied to all units composing the micro-material handling system 200, such as the PC6 and the micro-manipulator 1, application software is started on the PC 6 and the micro-manipulator 1 completes its initializing setting processes, the PLC8 (its CPU) sends the states of each actuator of the micro-manipulator 1 to the PC6.

The PC6 determines whether the detected states are erroneous by referencing program data. If a state is erroneous, the PC6 displays the location of the error and degree of error on the monitor 7; if there is no error (or the degree of error is low), the PC6 prompts the operator whether it is acceptable to position the handling unit 34 at a reference position (direction) so that the gripping fingers 341 do not inadvertently come into contact with the subject (such as a Schale with cells) placed on the XY stage, and idles until a positive input is received from the controller 9 via the PLC8. When there is an input from the controller 9, the PC6 instructs the PLC8 to position the handling unit 34 at the reference position. The PLC8 notifies the PC6 that preparations for handling the cell 10 are complete when the handling unit 34 reaches the reference position. Note that the PLC8 notifies input information from the PC6 and receives operating instructions from the PC6 when there is input from the controller 9.

The PC6 displays in a small window to inform the operator that the cell 10 can be handled, and displays an inquiry whether to set or to change a maximum current value Imax flowing to the gripping actuator 71 and a reference current value Ia that is smaller than the maximum current value Imax flowed to the gripping actuator 71 until at least the gripping fingers 341 touch the cell 10, and idles until there is input from the controller 9. The operator then inputs the maximum current value Imax and the reference current value Ia from the controller 9. The maximum current value Imax and the reference current value Ia can be set for the expected degree of softness of the cell 10, and if the softness of the cell 10 is unknown, the current value can be set to a small one at first and gradually increased. When there is input from the controller 9, the PC6 notifies the set or changed maximum current value Imax and the reference current value Ia to the PLC8. According to this embodiment of the present invention, such input operations can be supported by application software. It is acceptable to record the input maximum current value Imax and the reference current value Ia onto the hard disk of the PC6 in advance and to apply that setting information. Also, to assist the operator in making settings or changes, it is acceptable to display tables or graphs that show relationships between the force with which the gripping fingers 341 can affect the cell 10, and the maximum current value Imax and the reference current value Ia on the monitor 7.

In that state, the operator can reference a microscope image with the monitor while inputting instructions for the X, Y and θz directions (the swinging direction of the handling unit 34 that is centered on the leading ends gripping fingers 341, in other words, the attitude direction of the handling unit 34), and the Z and θk directions (the rotation angle of the handling unit 34 that is centered on the shaft 348, in other words the attitude direction of the handling unit 34) to the micro-manipulator 1, to position the cell 10 at an opening of the gripping fingers 341. According to this embodiment of the present invention, this input operation can be supported by application software, and it is possible to use a joystick or crosshairs button for the operation.

The PLC8 notifies the PC6 of the input information from the controller 9 by converting the components of the X, Y, and Z directions, and the θz and θk directions. The PLC8 drives the X direction actuator 311 and the Y direction of the XY drive unit 31, and the Z direction actuator 331 of the Z drive unit 33 to move the micro-material 10 to a position at an opening between the two gripping fingers 341 and idles until an instruction from the PC6.

With the XY direction drive, when an operating signal is applied to the X direction actuator 311, the stepping motor 311a rotates the ball screw 311b thereby moving the X direction input link 317a of the pantograph mechanism 317 in the X direction via the slider 311c. When an operating signal is applied to the Y direction actuator 312, the stepping motor 312a rotates the ball screw thereby moving the Y direction input link 317b of the pantograph mechanism 317 in the Y direction via the slider 317. As described above, synthesized displacements of the displacements of the X and Y directions are output to the output link 317c of the pantograph mechanism 317 by input of the X and Y directions. Therefore, the handling unit 34 pivotally supported on the output link 317c via the Z drive unit 331 is moved in the X and Y directions. When an operating signal is applied to the θz actuator 315, the rotating shaft of the pulley 315c is rotated via the belt 315b to apply swinging displacement (θz displacement) to the X direction input link 317a of the pantograph mechanism 317. This causes swinging displacement of the same angle to be output to the output link 317c via the pantograph mechanism 317. Therefore, the handling unit 34 is moved in the X and Y directions and the attitude direction of handling unit 34 is changed with regard to the cell 10, centering on the leading ends of the gripping fingers 341.

With the Z direction drive, when an operating signal is input to the stepping motor 331a of the Z drive unit 331, the rotating drive force of the stepping motor is transmitted to the ball screw 331b via the deceleration gear train arranged in the gear box to move the nut screwed to the ball screw 331b in the Z direction. This moves the handling unit 34 supported via the support member 333 fastened to the nut to be moved in the Z direction. With the θk direction drive, when an operating signal is applied to the θk actuator 36, the rotating drive force of the stepping motor is transmitted to the handling unit 34 via the deceleration gear train, and the shaft 348, to rotate the handling unit 34 around the shaft 348.

<Gripping Drive>

When the two gripping fingers 341 are at a proper attitude with regard to the cell 10, the operator uses the controller 9 to input a gripping instruction to grip the cell 10 with the leading ends of the gripping fingers 341. The PLC8 notifies the gripping instruction from the controller 9 to the PC6, drives the gripping actuator 71 to grip the cell 10 with the gripping fingers 341, and then waits for an instruction from the PC6.

With the gripping drive, the PLC 8 supplies a current of the predetermined reference current value Ia to the gripping actuator 71. The supplied current's flowing through the covered copper wire coil of the gripping actuator 71 causes the permanent magnet 711 to rotate the rotating shafts 711a-b thereby swinging the lever 72 via the output pin 711c and slit centering on the fulcrum shaft. Through this, the movable end effecter 341a of the handling unit 34 moves into proximity (or away from) the fixed end effecter 341b according to the rotation angle of permanent magnet 711. In other words, the movable end effecter 341a and the fixed end effecter 341b held in a mutually separated state approach each other with the rotation of the output pin 711c by PLC 8 controlling communication of the gripping actuator 71 and touch the cell 10. At this time, by changing the rotation angle of the permanent magnet 711, changes are generated in the magnetic field of the permanent magnet 711. This change in the magnetic field is detected by the Hall element 715a and sent to the PLC 8 via the drive circuit 35. This makes it possible for the PLC 8 to detect the actual rotated angle of the permanent magnet 711. Note that by varying the current value supplied to the gripping actuator 71 with a constant voltage, it is possible to change the power for driving the gripping actuator 71.

The PLC 8 compares the actual rotation angle (hereinafter referred to as the actual angle) of the gripping actuator 71 detected by the Hall element 715a and the rotation angle (hereinafter referred to as the target angle) rotated with the reference current value Ia and reported from the PC 6, and sends (informs) the angle difference $\Delta\theta$ between the actual angle and the target angle to the PC 6. The actual angle is detected at the sampling speed, and the PLC 8 records four angle differences $\Delta\theta$ in RAM.

Figure 6:
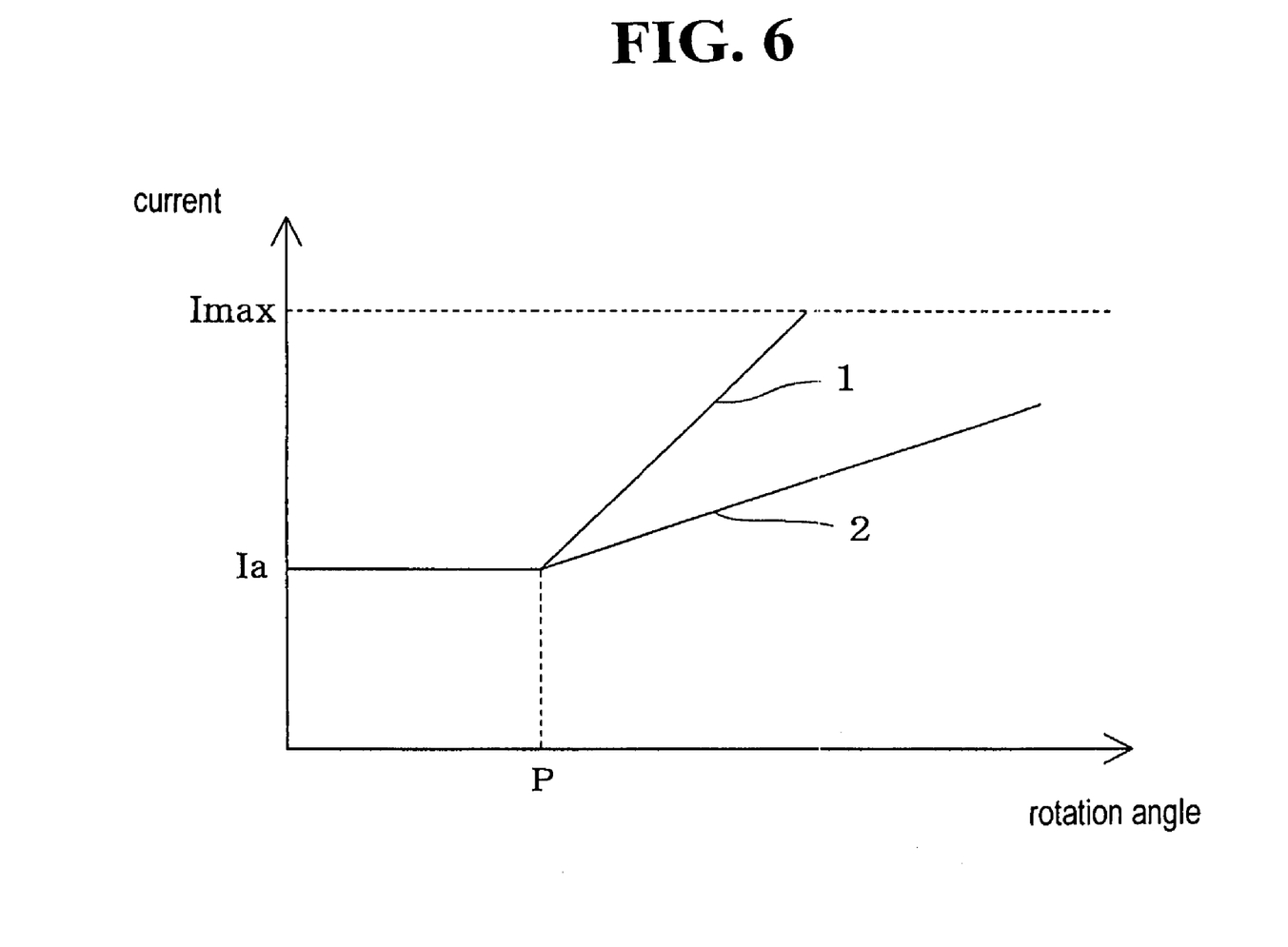
FIG. 6 is a graph showing a model of changes in current value supplied to the gripping actuator that corresponds to a rotation angle of the gripping actuator.

When the leading ends of the movable end effecter 341a and the fixed end effecter 341b touch the cell 10, repulsive force caused by the resilience of the cell 10 acts on the leading ends of the gripping fingers 341, and the movement of the movable end effecter 341a is suppressed thereby increasing the angle difference $\Delta\theta$. To grip the cell 10, it is necessary to further move the movable end effecter 341a, so a current with a greater current value than the reference current value Ia is supplied to the gripping actuator 71. As shown in FIG. 6, after the leading ends of the gripping fingers 341 touch the cell 10, the current flowing to the gripping actuator 71 increases to a value greater than the reference current value Ia. As shown in the straight line 1 of FIG. 6, the rate of the increase of the current value increase as the resiliency of the cell 10 increases. As shown by the straight line 2, the rate of the increase lowers as the resilience decreases (the inclination is lower). Note that FIG. 6 shows the rotation angle P when the leading ends of the gripping fingers 341 are touching the cell 10.

The PLC 8 determines that the leading ends of the gripping fingers 341 are touching the cell 10 when the angle difference $\Delta\theta$ stored in RAM has an increasing tendency, in other words, when the angle difference $\Delta\theta$ increases three times consecutively, and preset to increase proportionally to the size of the angle difference $\Delta\theta$. The amplification factor for amplifying the current value supplied to the gripping actuator is notified to the PC 6. The PLC 8 supplies the current value I amplified at the reference current value Ia with the amplification factor, and drives the gripping actuator 71 so that the angle difference $\Delta\theta$ becomes smaller. Note that the PC 6 shows a small window on the monitor informing the operator that the leading ends of the gripping fingers 341 have touched the cell 10. With this, the operator understands that the leading ends of the gripping fingers 341 have touched the cell 10.

As the current value supplied to the gripping actuator 71 is increased, the driving force of the actuator 71 increases. Put in a different way, if a force that is greater than what is necessary is applied to the cell 10, there is the possible of damaging the cell 10. For that reason, a current control circuit that can set the maximum current value Imax flowing to the gripping actuator 71 in 1 mA increments is used.

The PLC 8 compares the current value I amplified by the amplification factor and the maximum current value Imax already informed from the PC 6 and if it is determined that the current value I exceeds the maximum current value Imax, the PC 6 is informed of this and the current value supplied to the gripping actuator 71 is controlled to the maximum current value Imax. For that reason, a current exceeding the maximum current value Imax is not supplied to the gripping actuator 71, so the gripping force of the gripping fingers 341 on the cell 10 is controlled.

After the gripping fingers 341 have touched the cell 10, the PLC 8 determines that the target angle and actual angle of the gripping actuator 71 are the same and that the gripping fingers 341 have gripped the cell 10 when the rate of time variation of the change of the angle difference $\Delta\theta$ recorded in the RAM, in other words, when the differential value (the absolute value of $\Delta\theta/\Delta t$) according to the time of the angle difference $\Delta\theta$ is smaller than a preset reference value. The time variation $\Delta t$ basically depends on the processing time of the CPU of the PLC 8, but here, it depends on the sampling speed (approximately 1 ms) described above. Also, the drive force of the gripping actuator 71 is at equilibrium with the repulsive force of the cell 10, so if the drive force is F, and the repulsive force is f, the drive force F and the repulsive force f are proportionate to the angle difference $\Delta\theta$ and can be expressed in the equation $F=f=\Delta\theta \times k$.

The proportional coefficient in this equation represents the resilience value k of the cell 10, so the PLC 8 calculates the resilience value k using the variant of that equation, $k=F/\Delta\theta$, and records that in RAM. Note that strictly speaking, drive force F is rotational torque. This is proportional to the supplied current (power) and is determined by the specifications as a characteristic of the gripping actuator 71.

The PLC 8 informs the calculated resilience value k to the PC 6. PC 6 displays the resilience value k in a small window on the monitor 7. This enables the operator to check the resiliency of the cell 10.

The operator inputs any operation such as to position the gripping fingers 341 at a predetermined position inside the Schale using the controller 9, while the gripping fingers 341 are gripping the cell 10. The PLC 8 converts the information input from the controller and sends that to the PC 6, drives the XY drive unit 31 and Z drive unit 33 to move the gripping actuator 31 gripping the cell 10 to a specified position, and then waits for an instruction from the PC 6. The PLC 8 supplies current to the gripping actuator 71 after the gripping fingers 341 have gripped the cell 10 and then detects the angle difference $\Delta\theta$. For that reason, the cell 10 is held even while the gripping fingers 341 are moving to a position.

The cell 10 gripped by the gripping fingers 341 has been positioned at a predetermined position so the operator inputs a release instruction to free the cell 10 from the gripping fingers 341 using the controller 9. The PLC 8 sends the release instruction from the controller 9 to the PC 6 to open the gripping fingers 341. At this time, the PLC 8 supplies a current of the direction opposite to the one when gripping the cell 10, to the gripping actuator 71. Note that by continuously energizing the gripping actuator 71, the gripping fingers 341 recover to their original, opened, state.

After gripping the cell 10 and moving to a predetermined position, the cell 10 is freed from the gripping fingers 341 so the operator inputs an instruction to retract the gripping fingers 341 using the controller 9. The PLC 8 positions the handling unit 34 at the reference position by driving the XY drive unit 31 and the Z drive unit 33. At that time, the operator can see the cell 10 or a piece of the cell 10 on the leading ends of the gripping fingers 341 on the monitor 7 and then input an instruction to separate the sticking cell 10 using the controller 9. The PLC 8 sends the separate instruction from the controller 9 to the PC 6 to separate the sticking material by driving the mechanical shock actuator.

With the instruction from the controller 9, a voltage is charged to the coil unit of the plunger solenoid that composes the mechanical shock actuator to generate magnetomotive force that pulls the plunger to the inside of the coil unit. Along with the movement of the plunger unit, the gripping base 74 rotates counterclockwise while resisting the urging force of the coil spring, using the pivotally supported shaft as the rotating pivot point, via the arm unit. This causes the stopper, that was touching the base, to separate from the base. The rotation of the gripping base is stopped by the plunger unit touching the stopper inside the coil unit. When the magnetomotive force of the coil unit is freed, the gripping base rotates in the clockwise direction, and the rotation of the gripping base is stopped by the stopper touching the base.

Operations of the plunger are the mechanical shock displacement performed during an extremely short period of time, and the mechanical shock when stopping is large, so the action of the force of inertia is used to separate the cell 10 sticking to the leading ends of the gripping fingers 341 when stopping rotation in the clockwise or counterclockwise directions. This completes one series of actions using the micro-material handling system 200.

(Actions)

The following explains the actions of the micro-material handling system 200 of this embodiment of the present invention focusing on the actions of the micro-manipulator 1 handling unit 34.

With operations on a micro-material, such as a conventional cell or metal, a micro-manipulator is used and operations are conducted on the micro-material while either viewing it under the visual field of the microscope by the naked eye, or by outputting an image of the micro-material to a monitor, such as a display, via a camera mounted to the microscope. However, resilience such as the hardness or softness of the micro-material varies enormously whether it is a cell or a metallic object. It is difficult to ascertain the resilience of the micro-material targeted for operations simply by viewing an image thereof. For that reason, the operator does not know the degree of force to apply to the micro-material and if too much force is applied to a metallic object, for example, it can be flicked away. Conversely, if too much force is applied to a cell, the cell can be crushed. In fact, the cell membrane of cells taken from animals is thin and soft, so there is the problem that they cannot be gripped. According to this embodiment of the present invention, a micro-manipulator can be used to solve these problems.

With the micro-manipulator 1 according to this embodiment of the present invention, the amplification factor of the current value supplied to the gripping actuator 71 is controlled by the PLC 8 so that at least after the gripping fingers 341 touch the cell 1, the angle difference $\Delta\theta$ of the target angle of the gripping actuator and the angle detected by the Hall element 715a is low. At this time, the drive of the gripping fingers 341 is suppressed with the repulsive force caused by the resilience of the cell 10, and as the angle difference $\Delta\theta$ increases, the current value supplied to the gripping actuator 71 is also amplified to be larger. This amplification factor is predetermined to be proportional to the angle difference $\Delta\theta$. Therefore, the drive force of the gripping actuator 71 that is driven at a current value controlled by the PLC 8 is adjusted to the repulsive force from the cell 10, so it is possible to grip the cell 10 using the gripping fingers 341 with the proper amount of gripping force.

Also, the angle difference $\Delta\theta$ of the gripping actuator 71 is recorded in the RAM of the PLC 8 with the micro-manipulator 1. The PLC 8 determines that when the differential value caused by the time of the angle difference $\Delta\theta$ is lower than the predetermined reference value, the gripping fingers 341 have gripped the cell 10. For that reason, when it has been determined by the PLC 8 that the gripping fingers 341 have gripped the cell 10, the current value flowed to the gripping actuator 71 is maintained, thereby suppressing an increase in the load applied to the cell 10 and enable the gripping of the cell 10 without it being damaged.

Also, with the micro-manipulator 1, when it has been determined that the gripping fingers 341 have gripped the cell 10, the PLC 8 divides the drive force F of the gripping actuator 71 that is driven by the supplied current by the angle difference $\Delta\theta$ ($k=F/\Delta\theta$) to calculate the resilience value k of the cell 10. This resilience value k represents the degree of softness of the cell 10, so it is possible to grip with the softness of the cell 10. The calculated resilience value k is displayed on the monitor 7, so it is possible for the operator to check the degree of disfiguration of the cell 10 along with the gripping of the gripping fingers 341 on the screen, and to grip the cell 10 while viewing the resilience value k. This makes it possible to accurately grip the cell 10 without damaging it.

Furthermore, the maximum current value Imax of the current supplied to the gripping actuator 71 is predetermined with the micro-manipulator 1. When the current value I amplified by the amplification factor determined by the PLC 8 exceeds the maximum current value Imax, the current value supplied to the gripping actuator 71 is limited to the maximum current value Imax. For this reason, the drive force of the gripping actuator 71 is limited when gripping the cell 10, so it is possible to avoid applying more than the necessary load on the cell 10.

In addition, the maximum current value Imax can be set to the characteristics of the cell 10. Also, the reference current value Ia can also be set to the characteristics of the cell 10. Therefore, for example, it is possible to grip cells which have different degrees of resilience, such as red blood cells or egg cells with the appropriate amount of gripping force.

Figure 5:
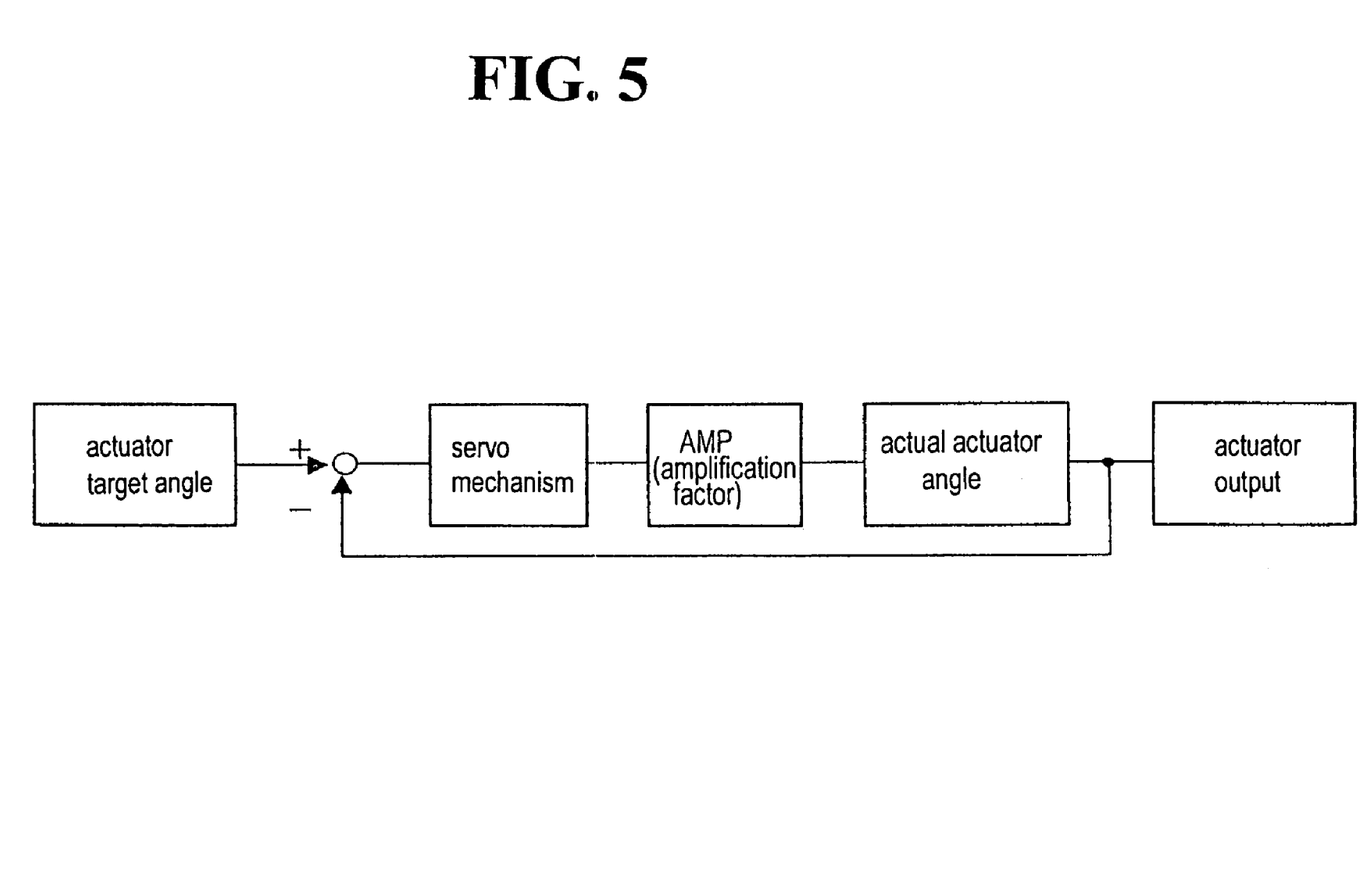
FIG. 5 is a block diagram shown a circuit equivalent to a control unit for controlling current supplied to the gripping actuator.

Note that with this embodiment of the present invention, the PLC 8 controls the current value supplied to the gripping actuator 71. However, the invention is not limited to this. For example, as shown in FIG. 5, it is acceptable to control using a servo mechanism or an operational amplifier. In such cases, it is possible to adjust the drive amount of the gripping actuator 71 by detecting the magnetic displacement accompanying the permanent magnet 711 of the gripping actuator 71 using the Hall element. Also, it is possible to arrange the servo mechanism or an operational amplifier at the drive circuit unit 35 of the micro-manipulator 1. Furthermore, as a substitute for controlling the current, it is possible to control voltage with a constant current.

Further, this embodiment of the present invention uses the Hall element 715a to detect the actual angle of the gripping actuator 71. However, it is also possible to detect the rotation angle of the permanent magnet 711 using a rotary encoder.

Still further, this embodiment of the present invention controls the current value by detecting the angle difference Δθ of the gripping actuator 71 at least after the gripping fingers 341 touch the cell 10. However, the invention is not limited to this. It is also possible to detect the angle difference Δθ prior to touching the cell 10. If the movement of the gripping fingers 341 is not suppressed prior to their touching the cell 10, it is possible to drive the gripping actuator 71 at the reference current value Ia (See FIG. 6). It is also possible to increase the current value supplied to the gripping actuator 71 to be greater than the reference current value Ia until the gripping fingers 341 touch the cell 10. This can shorten the amount of time for moving the gripping fingers 341 into contact with the cell 10.

Also, this embodiment of the present invention provides an example of displaying the resilience value k of the cell 10 calculated by the PLC8, but the invention is by not limited to that. For example, it is acceptable to display the resilience value k using a level meter. Also, because the resilience value k is recorded in RAM on the PLC8, it is possible to display it on the monitor 7 via display input from the controller 9. Furthermore, it is acceptable to continuously display the angle difference Δθ. If this is done, the operator can verify the degree of deformation of the cell 10 in real time, thereby improving the gripping operation.

Also, this embodiment of the present invention exemplifies the PLC8 controlling the current value supplied to the gripping actuator 71, the determination of whether the gripping fingers 341 have gripped the cell 10 and the calculation of the cell's 10 resilience value. However, this can also be done by the PC6. This embodiment of the present invention also exemplifies a cell 10 as the micro-material. However, the invention is not limited thereto, and can operation micro-material of a hard nature, such as metal.

INDUSTRIAL APPLICATION

This invention can appropriately grip a resilient micro-material, and provides a micro-manipulator that allows an operator to ascertain a resilience value of the micro-material, and thereby contribute to the manufacture and sales of micro-manipulators and their applicability in industry.

What is claimed is:

1. A micro-manipulator comprising:
   grippers for gripping micro-material;
   an actuator for driving the grippers;
   a drive amount detection device for detecting a drive amount of the actuator;
   a power control device for controlling power supplied to the actuator so that a difference in a target drive amount of the input actuator and a drive amount detected by the drive amount detection device is small, after at least the grippers touch the micro-material;
   a gripping determination device for determining that grippers have gripped the micro-material based on the difference; and
   a resilience value calculation device for calculating a resilience value that represents a degree of softness of the micro-material by dividing the actuator drive force that is equivalent to the repulsive force of micro-material gripped by the grippers in proportion to power supplied to the actuator via the power control device.

2. The micro-manipulator according to claim 1, wherein the power control device control a current supplied at a constant voltage to the actuator in proportion to the difference.

3. The micro-manipulator according to claim 2, further comprising current setting device for setting the current supplied to the actuator, wherein the power control device supply the current set by the current setting device to the actuator prior to at least the grippers touching the micro-material.

4. The micro-manipulator according to claim 2, further comprising maximum current setting device for setting a maximum current to be supplied to the actuator, wherein the power control device supply a current to the actuator using the maximum current set by the maximum current setting device as an upper limit.

5. The micro-manipulator according to claim 1, wherein the gripping determination device determine that the grippers have gripped the micro-material when a differential value of the time of the difference is smaller than a preset value.

6. The micro-manipulator according to claim 1, wherein the resilience value calculating device calculate the resilience value using an equation:

$$k = F/\Delta\theta,$$

where F is the actuator drive force, Δθ is the difference, and k is the resilience value of the micro-material.

7. The micro-manipulator according to claim 1, wherein the drive amount detection device comprise a Hall element embedded in the actuator.

8. The micro-manipulator according to claim 1, wherein the grippers have two end effecters and the actuator is a meter.

9. The micro-manipulator according to claim 1, further comprising a resilience value output device for outputting the resilience value calculated by the resilience value calculation device.

* * * * *